United States Patent
Collins et al.

(10) Patent No.: US 7,024,550 B2
(45) Date of Patent: Apr. 4, 2006

(54) METHOD AND APPARATUS FOR RECOVERING FROM CORRUPTED SYSTEM FIRMWARE IN A COMPUTER SYSTEM

(75) Inventors: David L. Collins, Magnolia, TX (US); Steven Ray Dupree, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 652 days.

(21) Appl. No.: 10/186,009

(22) Filed: Jun. 28, 2002

(65) Prior Publication Data

US 2004/0003226 A1    Jan. 1, 2004

(51) Int. Cl.
*G06F 9/24* (2006.01)
*G06F 11/20* (2006.01)

(52) U.S. Cl. ............... 713/2; 714/23; 714/55
(58) Field of Classification Search ........ 713/1, 713/2; 714/1, 2, 6, 10, 11, 23, 25, 38, 48, 714/55

See application file for complete search history.

(56) References Cited

U.S. PATENT DOCUMENTS

| | | | |
|---|---|---|---|
| 5,797,023 A * | 8/1998 | Berman et al. | 713/324 |
| 6,119,228 A | 9/2000 | Angelo et al. | 713/180 |
| 6,158,000 A | 12/2000 | Collins | 713/1 |
| 6,185,696 B1 * | 2/2001 | Noll | 714/6 |
| 6,321,278 B1 | 11/2001 | Phu et al. | 710/14 |
| 6,651,188 B1 * | 11/2003 | Harding et al. | 714/38 |
| 2001/0016918 A1 * | 8/2001 | Alexander et al. | 713/323 |

* cited by examiner

*Primary Examiner*—Thuan Du

(57) ABSTRACT

The disclosed embodiments relate generally to providing increased data integrity in computer systems and, more particularly, to using a system management processor to overcome a computer system failure because of corrupted programming. A system management processor detects an attempted boot by host computer system and starts a watchdog timer. If the system BIOS or other firmware fails to execute, the watchdog timer expires and the system management processor places the system processor(s) in a reset state. The system management processor provides the address of a back-up BIOS or firmware and releases the system processor(s) from the reset state. The system processor(s) are redirected to the back-up BIOS or firmware and the computer system is able to boot.

20 Claims, 3 Drawing Sheets

METHOD AND APPARATUS FOR RECOVERING FROM CORRUPTED SYSTEM FIRMWARE IN A COMPUTER SYSTEM

BACKGROUND OF THE INVENTION

1. Field of the Invention

The disclosed embodiments relate generally to providing increased data integrity in computer systems and, more particularly, to using a system management processor to overcome a computer system failure because of corrupted programming.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Since the introduction of the first personal computer ("PC") over 20 years ago, technological advances to make PCs more useful have continued at an amazing rate. Microprocessors that control PCs have become faster and faster, with operational speeds eclipsing the gigahertz (one billion operations per second) and continuing well beyond.

Productivity has also increased tremendously because of the explosion in development of software applications. In the early days of the PC, people who could write their own programs were practically the only ones who could make productive use of their computers. Today, there are thousands and thousands of software applications ranging from games to word processors and from voice recognition to web browsers.

a. The Evolution of Networked Computing and System Management Tools

In addition to improvements in PC hardware and software generally, the technology for making computers more useful by allowing users to connect PCs together and share resources between them has also seen rapid growth in recent years. This technology is generally referred to as "networking." In a networked computing environment, PCs belonging to many users are connected together so that they may communicate with each other. In this way, users can share access to each other's files and other resources, such as printers. Networked computing also allows users to share internet connections, resulting in significant cost savings. Networked computing has revolutionized the way in which business is conducted across the world.

Not surprisingly, the evolution of networked computing has presented technologists with some challenging obstacles along the way. One obstacle is connecting computers that use different operating systems ("OSes") and making them communicate efficiently with each other. Each different OS (or even variations of the same OS from the same company) has its own idiosyncrasies of operation and configuration. The interconnection of computers running different OSes presents significant ongoing issues that make day-to-day management of a computer network challenging.

Another significant challenge presented by the evolution of computer networking is the sheer scope of modern computer networks. At one end of the spectrum, a small business or home network may include a few client computers connected to a common server, which may provide a shared printer and/or a shared internet connection. On the other end of the spectrum, a global company's network environment may require interconnection of hundreds or even thousands of computers across large buildings, a campus environment, or even between groups of computers in different cities and countries. Such a configuration would typically include a large number of servers, each connected to numerous client computers.

Further, the arrangements of servers and clients in a larger network environment could be connected in any of a large number of topologies that may include local area networks ("LANs"), wide area networks ("WANs") and municipal area networks ("MANs"). In these larger networks, a problem with any one server computer (for example, a failed hard drive, corrupted system software, failed network interface card or OS lock-up to name just a few) has the potential to interrupt the work of a large number of workers who depend on network resources to get their jobs done efficiently. Needless to say, companies devote a lot of time and effort to keeping their networks operating trouble-free to maximize productivity.

An important aspect of efficiently managing a large computer network is to maximize the amount of analysis and repair that can be performed remotely (for example, from a centralized administration site). Tools that facilitate remotely analyzing and servicing server problems help to control network management costs by reducing the number of network management personnel required to maintain a network in good working order. System management also makes network management more efficient by reducing the delay and expense of analyzing and repairing network problems. Using remote management tools, a member of the network management team may identify problems and, in some cases, solve those problems without the delay and expense that accompanies an on-site service call to a distant location.

In one system management strategy, a system management processor, which is completely separate from the system microprocessor(s), operates independently to provide system management functionality and remote communication capability. These system management processors have the capability of monitoring and controlling a wide range of system information. Some system management processors may be powered up even when the main computer system that they support is not powered up.

b. The Need for Robustness when System Data Becomes Corrupted

Modern users of computer systems typically expect very high levels of availability from their systems. To satisfy this desire, manufacturers of computer systems strive to make systems as robust as possible. One source of potential system problems is corruption of data stored in non-volatile random access memory (NVRAM) or electrically erasable and programmable read only memory (EEPROM). The corruption of data can occur for any number of reasons, such as system power failure during operation of the computer system, errors while flashing the EEPROM of the computer system to upgrade the BIOS or other firmware or the like.

The system BIOS or other system firmware of most computer systems is typically stored in EEPROM memory. One example of system firmware that may be stored in EEPROM memory is Processor Abstraction Layer (PAL) Code that is typically used in computer systems that implement the IA64 architecture promulgated by Intel Corporation of Santa Clara, Calif. In many systems, an additional back-up copy of the BIOS or system firmware is also stored in EEPROM memory. If the system BIOS becomes corrupt, the computer system will probably not be able to boot or otherwise operate correctly. When a system is down because of BIOS corruption, users are not able to access system resources, making it more difficult for them to perform their assigned tasks. Repair of systems with corrupted BIOS or other firmware can be costly and time consuming. Even in cases where the system BIOS or other firmware is backed up, an on-site service call may be required to cause the failed machine to load the backed up copy of the BIOS or other firmware. A method and apparatus that reduces undesirable system downtime because of the corruption of the system BIOS or other firmware is desirable.

BRIEF DESCRIPTION OF THE DRAWINGS

The foregoing and other advantages of the invention will become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
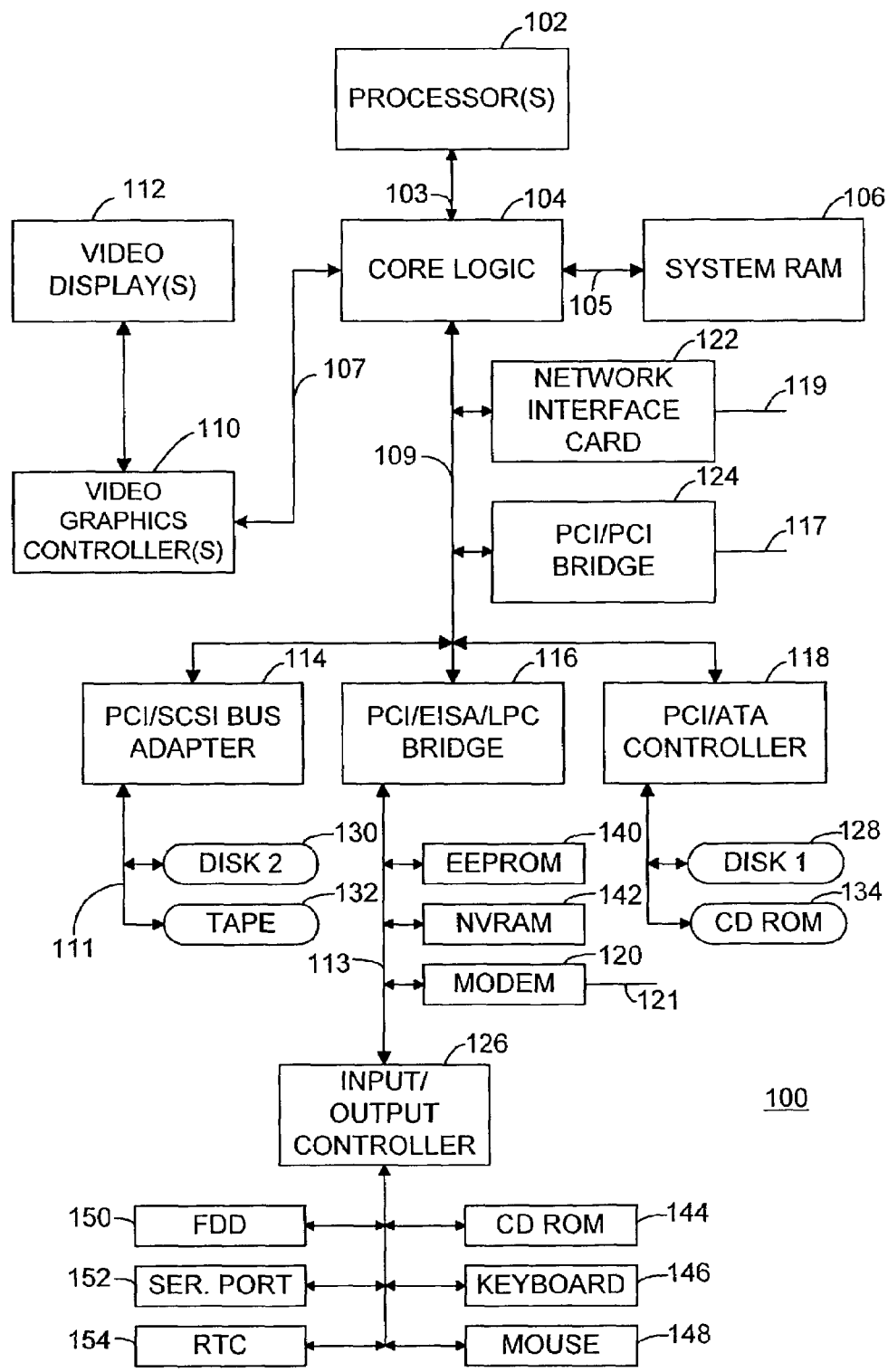
FIG. 1 is a block diagram illustrating a computer system in which the present invention may be practiced.

Referring now to FIG. 1, a schematic block diagram of a computer system utilizing the present invention is illustrated. A computer system is generally indicated by the numeral 100 and comprises a processor (or processor complex comprising multiple central processing units) 102. Also included in the computer system 100 are core logic chipset 104 (or north bridge), system random access memory ("RAM") 106, a video graphics controller(s) 110, a video display(s) 112, a PCI/SCSI bus adapter 114, a PCI/EISA/LPC bridge 116, and a PCI/ATA controller 118. A hard drive 128 and CD ROM drive 134 may be connected to the PCI/ATA controller 118.

Single or multilevel cache memory (not illustrated) may also be included in the computer system 100 according to the current art of microprocessor computer systems. If the computer system 100 includes multiple processors, they may be arranged in a symmetric or asymmetric multiprocessor configuration.

The processor 102 is connected to the core logic 104 through a host bus 103. The system RAM 106 is connected to the core logic 104 through a memory bus 105. The configuration registers of the computer system may be incorporated into the processor or in the system RAM 106 (or some combination of the two). The configuration registers may be designed to control the operation of many of the system components shown in FIG. 1.

The video graphics controller(s) 110 is connected to the core logic 104 through an AGP bus 107 (or other bus for transporting video data). The PCI/SCSI bus adapter 114, PCI/EISA/LPC bridge 116, and PCI/ATA controller 118 are connected to the core logic 104 through a primary PCI bus 109. Those of ordinary skill in the art will appreciate that a PCI-X bus or Infiniband bus may be substituted for the primary PCI bus 109. The specific protocol of the bus 109 is not a crucial aspect of the present invention.

Also connected to the PCI bus 109 are a network interface card ("NIC") 122 and a PCI/PCI bridge 124. Some of the PCI devices such as the NIC 122 and PCI/PCI bridge 124 may plug into PCI connectors on the computer system 100 motherboard (not illustrated). The PCI/PCI bridge 124 provides an additional PCI bus 117.

A hard disk 130 and a tape drive 132 are connected to the PCI/SCSI bus adapter 114 through a SCSI bus 111. The NIC 122 is connected to a local area network 119. The PCI/EISA/LPC bridge 116 connects over a low pin count (LPC) bus 113 to a Electrically Erasable Random Access Memory (EEPROM) 140, a non-volatile random access memory (NVRAM) 142, a modem 120, and an input-output controller 126. The EEPROM 140 may store the system BIOS or other system firmware and may include flash memory. The NVRAM 142 may store system configuration settings and the like. The NVRAM 142 may include a programmable logic array ("PAL") or any other type of programmable non-volatile storage.

The modem 120 connects to a telephone line 121. The input-output controller 126 interfaces with a keyboard 146, CD-ROM drive 144, mouse 148, floppy disk drive ("FDD") 150, serial/parallel ports 152 and a real time clock ("RTC") 154. The LPC bus 113 is a slower information bus than the PCI bus 109, but it costs less to interface with the LPC bus 113.

Figure 2:
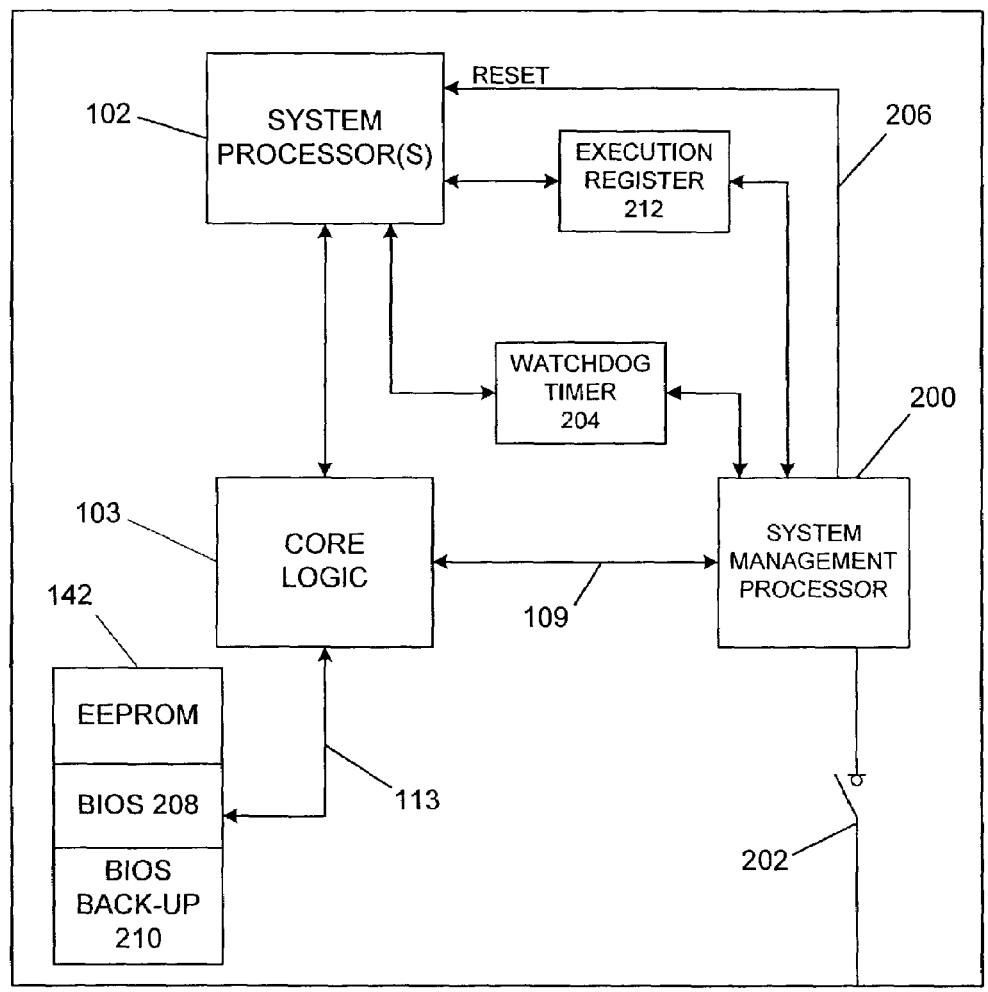
FIG. 2 shows a functional block diagram of one exemplary embodiment of the disposition of a system management processor in the context of the present invention.

FIG. 2 shows a functional block diagram of one exemplary embodiment of the disposition of a system management processor in the context of the present invention. A system management processor 200 is connected so that it may exchange information over the PCI bus 109.

Many modern computer systems employ a messaging protocol known as the Advanced Programmable Interrupt Controller protocol, which is sometimes referred to by the acronym APIC. Computer systems based on IA-32 processors manufactured by Intel Corporation of Santa Clara, Calif. are examples of computer systems that may employ the APIC protocol. Intel also produces IA-64 processors that employ a similar protocol known as System Advanced Programmable Interrupt Controller protocol or SAPIC. The APIC and SAPIC protocols provide the system microprocessor(s) 102 with the ability to send and receive software interrupts. The system management processor 200 may be adapted to send and receive messages using the APIC or SAPIC protocols via the PCI bus 109 or any other communication interface.

The system management processor 200 may be disposed on an add-in card or it may be embedded on the motherboard or other circuit board of the computer system 100. The exact configuration and location of the system management processor 200 is not a crucial aspect of the present invention. Additionally, the system management processor 200 may have access to independent communications interfaces to facilitate transmitting information to users or members of a network management team. Examples of such interfaces include a Universal Serial Bus (USB) interface, an LCD interface, a floppy drive interface and/or a CD ROM interface. These interfaces may be independent of similar interfaces that are used by the computer system 100.

As set forth above, the system management processor 200 may be adapted to monitor a wide variety of activities and functions of the system processor or processors 102 or other components of the computer system 100. The system management processor 200 may be connected so that it is powered up and functional even though the computer system 100 is powered down and not operating. Moreover, the system management processor 200 operates independently of the system processor or processors 102. This independent operation makes the system management processor 200 ideally suited to perform monitoring and remote management tasks. The independent nature of the system management processor 200 makes the computer system 100 more robust because it allows a user to obtain information about system problems and service many problems remotely without requiring on-site user intervention. The system management processor 200 is also able to perform system-related tasks such as upgrading programming stored in NVRAM or EEPROM when the computer system 100 is powered off.

The system management processor 200 is connected so that it may monitor the status of a system power switch 202. The system power switch 202 provides main power to the computer system 100. As previously set forth, the system power switch 202 does not control the application of power to the system management processor 200, which is powered up continuously in the illustrated embodiment. Additionally, the system management processor 200 is connected so that it may control the operation of a watchdog timer 204. When the system management processor 200 detects a boot attempt, the system management processor 200 may initiate the watchdog timer, which may be programmed to expire after a predetermined time period.

The system management processor 200 may be adapted to determine when the computer system 100 is being booted in a variety of ways. In the illustrated embodiment, the system management processor 200 knows that the system is being booted when it detects that the system is being powered up by the system power switch 202. The system management processor may also be adapted to detect when a request to boot interrupt (INT 19) is asserted, for example, using either the APIC or SAPIC protocols. The exact method by which the system management processor determines that the computer system 100 is being booted is not a crucial aspect of the present invention.

When the computer system 100 is booted, the system processor(s) 102 obtains the address of the system BIOS or firmware that it is supposed to execute from an execution register 212. The system management processor 200 is also adapted to access the execution register 212. As set forth above, the BIOS or other firmware may be stored at an address in the system EEPROM 142. A system BIOS 208 in FIG. 2 is illustrated as being stored in the EEPROM 142. Also, a BIOS back-up 210 is stored in the EEPROM 142. The BIOS back-up 210 may be a known-good copy of a previous version of the system BIOS 208 that is intended to be accessed if the BIOS 208 has become corrupted. Ordinarily, the starting address of the BIOS 208 will be stored in the execution register 212 so the computer system 100 will begin execution at that address when booted.

The system BIOS 208 may contain instructions to cause the system processor(s) 102 to shut off the watchdog timer 204 after it successfully executes the system BIOS 208. Alternatively, the system BIOS 208 may contain instructions to cause the system processor(s) 102 shut off the watchdog timer 204 after executing a sufficient amount of the system BIOS 208 to determine that the system BIOS 208 is not corrupt, but not the entire system BIOS 208. If the system processor(s) 102 is unable to execute the BIOS 208 for any reason such as corruption of the BIOS 208, the watchdog timer 204 will expire without being shut off by the system processor(s) 102.

If the watchdog timer 204 expires, the system management processor 200 may be adapted to place the system processor(s) 102 in a reset state by asserting a resent signal 206 to the system processor(s) 102. While the system processor(s) 102 is in the reset state, the system management processor 200 may write the address of the BIOS back-up 210 into the execution register 212. After writing the address of the back-up BIOS 210 to the execution register 212, the system management processor 200 may release the system processor(s) 102 from the reset state so that they may continue execution. Upon being released from the reset state, the system processor(s) 102 may read the address of the back-up BIOS 210 from the execution register 212 and execute the back-up BIOS. In this manner, the need for an on-site service call to repair the computer system 100 after corruption of the BIOS 208 is avoided.

Figure 3:
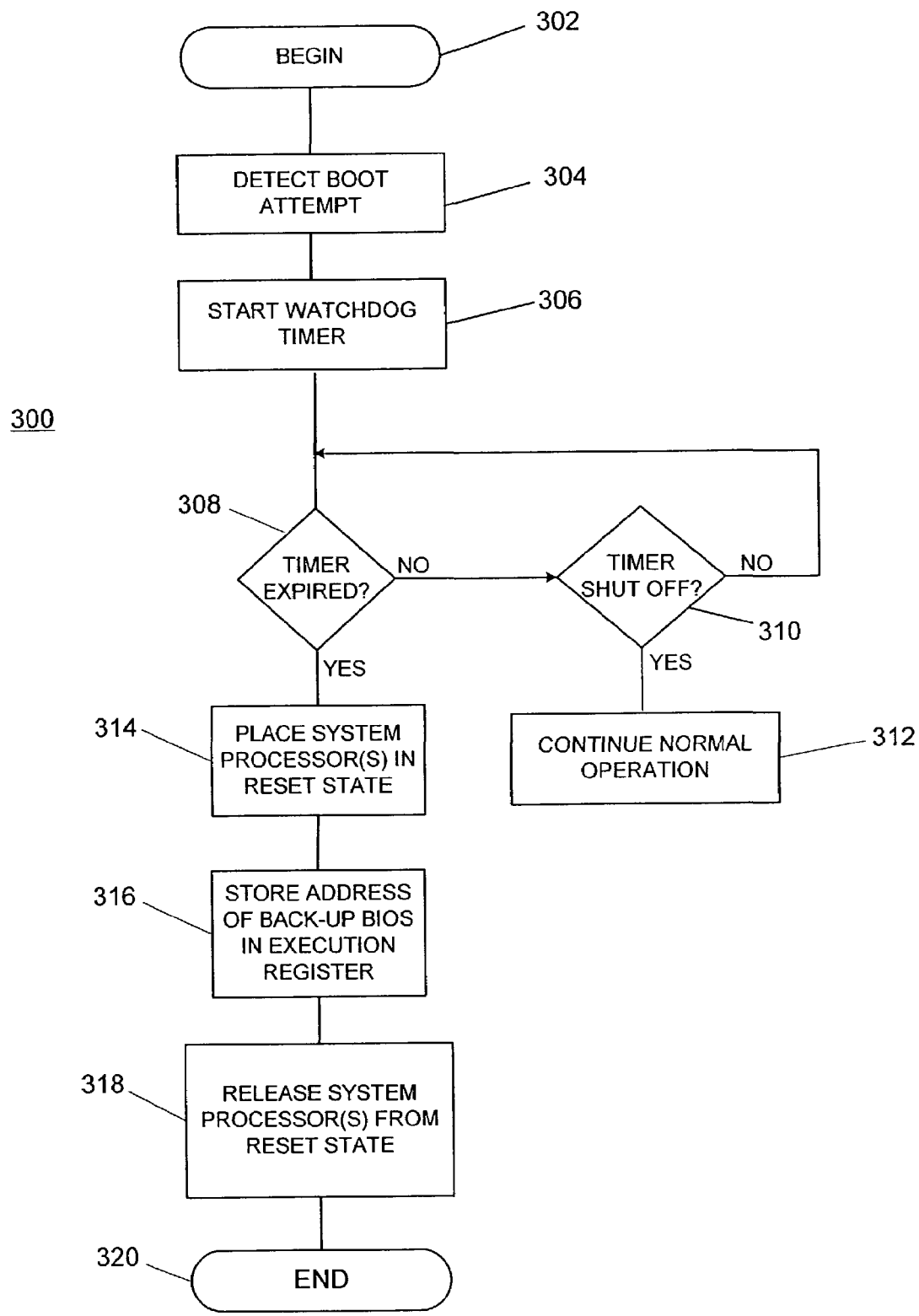
FIG. 3 is a process flow diagram illustrating the operation of an embodiment of the present invention.

FIG. 3 is a process flow diagram illustrating the operation of an embodiment of the present invention. The process is generally referred to by the reference numeral 300. At 302, the process is initiated by the powering on of the computer system 100 (FIG. 1). At 304, the system management processor 200 (FIG. 2) detects an attempt to boot the computer system 100. In response, the system management processor 200 initiates the watchdog timer 204 (FIG. 2), as depicted at 306. The watchdog timer 204 is programmed to count down to expiration over a predetermined period of time. In the illustrated embodiments, the predetermined period of time is sufficiently long that, if the watchdog timer 204 expires, it is likely that the system BIOS is not capable of execution because it has been corrupted. The watchdog timer 204 continues to count down until it is either shut off or expires.

If the watchdog timer 204 is shut off (decision 310) normal operation of the computer system continues at 312. As discussed above, the watchdog timer 204 will be shut off if the system BIOS or firmware is not corrupt.

If the watchdog timer 204 expires before being shut off, this signifies that the system BIOS 208 or firmware is corrupt and not capable of successful execution. The system management processor 200 places the system processor(s) 102 in a reset condition, as shown at 314. At 316, an address corresponding to the starting location of the back-up BIOS 210 is stored in the execution register 212 by the system management processor 200. At 318, the system management processor 200 releases the system processor(s) from the reset state. The system processor(s) 102 continue booting using the back-up BIOS 210. At 320, the process ends.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system management device that supports a computer system having at least one system processor, the at least one system processor adapted to execute a system BIOS beginning at a starting address, the system management device comprising:
   a system management processor adapted to:
      detect a boot attempt of the computer system;
      initiate a countdown from a starting point to an expiration point responsive to detecting a boot attempt;
      if the countdown reaches the expiration point:
         place the at least one system processor in a reset state;
         provide a starting address of an alternate system BIOS to the at least one system processor; and
         release the at least one system processor from the reset state; and
      if the countdown is stopped before reaching the expiration point:
         allow the at least one system processor to continue executing without placing the at least one system processor in the reset state.

2. The system management device of claim 1 wherein the system management processor detects a boot attempt of the computer system by monitoring a power switch.

3. The system management device of claim 1 wherein the system management processor detects a boot attempt of the computer system by intercepting a request to boot interrupt.

4. The system management device of claim 3 wherein the request to boot interrupt is asserted according to the Advanced Programmable Interrupt Controller (APIC) protocol.

5. The system management device of claim 3 wherein the request to boot interrupt is asserted according to the System Advanced Programmable Interrupt Controller (SAPIC) protocol.

6. The system management device of claim 1 wherein the system management processor is adapted to provide a starting address of an alternate system BIOS by loading the starting address of the alternate system BIOS into an execution register.

7. The system management device of claim 1 wherein the alternate system BIOS is a back-up BIOS.

8. A computer system that includes at least one system processor and a system management processor, the at least one system processor adapted to execute a system BIOS beginning at a starting address, the computer system comprising:
   a core logic chipset adapted to exchange data with the at least one system processor and the system management processor;
   at least one input/output device adapted to deliver input data from a user to the core logic chipset;
   a video graphics controller connected to the core logic chip set;
   a storage device that is adapted to store the system BIOS; and
   wherein the system management processor is adapted to:
      detect a boot attempt of the computer system;
      initiate a countdown from a starting point to an expiration point responsive to detecting a boot attempt;
      if the countdown reaches the expiration point:
         place the at least one system processor in a reset state;
         provide a starting address of an alternate system BIOS to the at least one system processor; and
         release the at least one system processor from the reset state; and
      if the countdown is stopped before reaching the expiration point:
         allow the at least one system processor to continue executing without placing the at least one system processor in the reset state.

9. The computer system of claim 8 wherein the system management processor detects a boot attempt of the computer system by monitoring a power switch.

10. The computer system of claim 8 wherein the system management processor detects a boot attempt of the computer system by intercepting a request to boot interrupt.

11. The computer system of claim 10 wherein the request to boot interrupt is asserted according to the Advanced Programmable Interrupt Controller (APIC) protocol.

12. The computer system of claim 10 wherein the request to boot interrupt is asserted according to the System Advanced Programmable Interrupt Controller (SAPIC) protocol.

13. The computer system of claim 8 wherein the system management processor is adapted to provide a starting address of an alternate system BIOS by loading the starting address of the alternate system BIOS into an execution register.

14. The computer system of claim 8 wherein the alternate system BIOS is a back-up BIOS.

15. A process for allowing a computer system to execute an alternate system BIOS after a failed attempt to execute a primary system BIOS, the computer system having at least one system processor, the method comprising the acts of:
   detecting a boot attempt of the computer system;
   initiating a countdown from a starting point to an expiration point responsive to detecting a boot attempt;
   if the countdown reaches the expiration point:
      placing the at least one system processor in a reset state;
      providing a starting address of the alternate system BIOS to the at least one system processor; and
      releasing the at least one system processor from the reset state; and
   if the countdown is stopped before reaching the expiration point:
      allowing the at least one system processor to continue executing without placing the at least one system processor in the reset state.

16. The process of claim 15 wherein the system management processor detects a boot attempt of the computer system by monitoring a power switch.

17. The process of claim 15 wherein the system management processor detects a boot attempt of the computer system by intercepting a request to boot interrupt.

18. The process of claim 17 wherein the request to boot interrupt is asserted according to the Advanced Programmable Interrupt Controller (APIC) protocol.

19. The process of claim 17 wherein the request to boot interrupt is asserted according to the System Advanced Programmable Interrupt Controller (SAPIC) protocol.

20. The process of claim 15 wherein the system management processor is provides a starting address of the alternate system BIOS by loading the starting address of the alternate system BIOS into an execution register.

* * * * *

UNITED STATES PATENT AND TRADEMARK OFFICE
CERTIFICATE OF CORRECTION

| | |
|---|---|
| PATENT NO. | : 7,024,550 B2 |
| APPLICATION NO. | : 10/186009 |
| DATED | : April 4, 2006 |
| INVENTOR(S) | : David L. Collins et al. |

It is certified that error appears in the above-identified patent and that said Letters Patent is hereby corrected as shown below:

In column 7, line 52, in Claim 8, delete "chip set" and insert -- chipset --, therefor.

In column 8, line 59, in Claim 20, after "processor" delete "is".

Signed and Sealed this

Nineteenth Day of May, 2009

JOHN DOLL
*Acting Director of the United States Patent and Trademark Office*